United States Patent [19]

Young

[11] Patent Number: 5,473,736
[45] Date of Patent: Dec. 5, 1995

[54] METHOD AND APPARATUS FOR ORDERING AND REMAPPING COLORS IN IMAGES OF REAL TWO- AND THREE-DIMENSIONAL OBJECTS

[75] Inventor: Fredric S. Young, Los Altos, Calif.

[73] Assignee: Chroma Graphics, Woodside, Calif.

[21] Appl. No.: 53,277

[22] Filed: Apr. 26, 1993

Related U.S. Application Data

[63] Continuation-in-part of Ser. No. 895,510, Jun. 8, 1992, Pat. No. 5,416,848.

[51] Int. Cl.$^6$ ............................................. G06T 5/00
[52] U.S. Cl. ........................ 395/131; 358/518; 358/520
[58] Field of Search ............................. 395/131–132, 395/125–127; 358/518–521, 515; 345/150

[56] References Cited

U.S. PATENT DOCUMENTS

| | | | |
|---|---|---|---|
| 5,012,299 | 4/1991 | Sawamura et al. | 355/326 |
| 5,187,570 | 2/1993 | Hibi et al. | 358/80 |
| 5,202,935 | 4/1993 | Kanomuri et al. | 382/54 |
| 5,239,370 | 8/1993 | Yamaguchi | 358/518 |
| 5,289,295 | 2/1994 | Yumiba et al. | 358/518 |

OTHER PUBLICATIONS

Lendley, et al *Fundamentals of True–Color Image Processing*, IEEE Comput Soc. Press. (Cat.#90 CH 289–5).
Foley, et al *Computer Graphics, Principles & Practices*, Addison Wesley Pub. Co. 2nd ed, 1990, 14–15, 598–9.

*Primary Examiner*—Heather R. Herndon
*Assistant Examiner*—Rudolph J. Buchel, Jr.
*Attorney, Agent, or Firm*—Townsend and Townsend and Crew; Kenneth R. Allen

[57] ABSTRACT

A color palette mapped to an image obtained by any known process is decomposed to separate contrast components from hue/saturation pairs, then only the hue/saturation pairs are remapped to a new set of hue/saturation parameters according to available mapping techniques, including remapping of ordered color sets, into a new ordered set wherein at least a portion of the contrast components are held at fixed values and not altered. By fixing the contrast components, color remapping is constrained to certain symmetric transformations in Munsell color space which preserves features of the source image in the resultant image.

10 Claims, 9 Drawing Sheets

METHOD AND APPARATUS FOR ORDERING AND REMAPPING COLORS IN IMAGES OF REAL TWO- AND THREE-DIMENSIONAL OBJECTS

CROSS-REFERENCE TO RELATED APPLICATION

This application is a continuation-in-part application of Ser. No. 07/895,510, now U.S. Pat. No. 5,416,848, filed Jun. 8, 1992 entitled METHOD AND APPARATUS FOR MANIPULATING COLORS OR PATTERNS USING FRACTAL OR GEOMETRIC METHODS, Fredric S. Young, inventor.

BACKGROUND OF THE INVENTION

This invention relates to the mathematical analysis and manipulation of ordered information, such as color, specifically for the mapping of complex color effects onto images encoded using fractal geometry and computer graphic image technology. More specifically, this invention relates to improvements whereby natural features of an image of a real two-dimensional or three-dimensional objects may be preserved while controlling the colorization of the image, either from gray-scale images to color or from colors of one palette to colors of another palette.

This invention derives elements from the fields of color science, fractal geometry and information visualization in computer graphics. Various systems have been used to represent colors. Computers usually represent color by the amount of red, green and blue components, and printing uses the four component cyan, yellow, magenta and black. Human color vision is based on a system of primary receptors for red, yellow and blue.

The first standardization of the specification and quantitative classification of color and the differences between color occurred in 1931. The Commission Internationale d'Elairage (CIE-The International Commission on Illumination) picked the lighting standards under which color would be measured and classified. A filter was used which produced a spectrum very close to daylight when illuminated with a tungsten lamp at the proper temperature, this became known as Illuminant Standard C. A second standard called Illuminant Standard A was adopted which has a similar energy distribution to a gas-filled tungsten lamp.

The measurement of color was standardized using a tri-stimulus system. $\overline{X}$ represents the spectral color red at 600 nm, and X represents a standard more saturated than $\overline{X}$. Y and $\overline{Y}$ represent a more saturated standard and spectral green respectively at 520 nm, and Z and $\overline{Z}$ represent a more saturated standard and spectral blue at 477 nm. Any color can be represented thereby by integrating over the region of the spectrum which represent the peaks for the red, green and blue standards. The calculations are lengthy and computerized spectrophotometers and photoelectric cells are commonly used. The color standards were chosen so that the green standard matched exactly the reading for that wavelength on a curve of luminosity/unit of power as a function of wavelength. In this way the luminance of colors can be related to the luminance of pure white or black.

Because color is represented, measured and quantified using color space, graphical methods are useful for visualizing aspects of color space. Because color space is a three-dimensional entity, it is difficult to represent graphically in two dimensions. For this reason, a two-dimensional system was developed called the chromaticity diagram. The red component of a color described using the tri-stimulus system is given by the formula $x=X/(X+Y+Z)$. The green component is $y=Y/(X+Y+Z)$ and blue is $z=Z/(X+Y+Z)$. Because $x+y+z=1$, only two of these quantities are independent and color can be represented by graphing two of the above quantities. Colors can be plotted on the x-y, x-z and y-z planes. The y-x plane is normally used for the chromaticity diagram.

The chromaticity diagram allows additive color mixture to be accomplished graphically. This cannot be done using the RGB tri-stimulus coordinates of two colors. The chromaticity diagram has a serious limitation for color measurement and the visualization of relationships between colors. A chromaticity diagram is a two-dimensional projection of a three-dimensional space. It contains distortions similar to those seen in the two-dimensional Mercator projection of the earth commonly used in maps. The distances between two colors in the chromaticity diagram do not necessarily accurately reflect their actual positions in color space.

The system just described is mainly used for quantitative color specification. To represent color in a manner which is most useful in the fields of art, design, and color photography requires a system of color ordering. The attempt to order colors has a rich history. It is believed that Leonardo da Vinci was the first to attempt color ordering by painting similar colors close to one another, and different colors further away. Newton was the first to arrange the hues in a circle with complementary hues occupying opposite positions on the circle. In 1745, Moses Harris arranged colors of the same hue but increasing saturation at increasing distances from the center along the radius of a circle.

Ostwald in the early 1900s distributed grays between black and white along an axis perpendicular to the circle of hues. Ostwald used a double cone for color space, a system that did not accurately reflect the quantitative relationships. The Ostwald system was the first to order color as a function of all three descriptive variables. These are most commonly called hue, saturation and value. Hue is the actual color such as red, green or blue. Saturation is the amount of the color. Colors with very low saturation are almost on the gray scale. Value is the same as brightness. Value orders colors with hue along the gray scale from black with zero value to white with a maximum value.

The double cone of the Ostwald system is not a true representation of color space. Each hue can vary in both brightness and saturation. The true space of hue, saturation, and value (brightness) is a cylinder. At the same time that Ostwald developed his color ordering system, the artist Munsell prepared a series of cards which represented the saturation and value or brightness of different hues. He developed cards for ten hues, ten value gradations and three to eight saturation steps for each view. These cards have been commercially available since 1904. The Munsell system has been very useful for artists and designers because it provides a logical and correct ordering of colors.

A technical analysis of color shows that hue corresponds to spectral frequency range, brightness corresponds to amplitude (as a function of frequency) and saturation corresponds to signal-to-noise ratio (as a function of frequency).

The Optical Society of America has evaluated the color order systems and used human observers to develop uniform color scales representing the color continuity and metric. A standardized set of scales was adopted in 1974. The optical society decided to adopt a set of 500 colors in Munsell color space that allowed arrangement into the maximum number of scales. A committee was employed to locate 500 points of equal perceptual distance in the three-dimensional color space based on the Munsell system. The lattice of points was arranged and depicted as colored spheres in a regular rhombohedral crystal. Each point in the lattice is equidistant from twelve other points. A three-dimensional model of this space was built using colored balls. This model contains 422 uniform scales of three or more steps.

The beauty of color use in art is based on the use of such color scales where colors are changed in graded steps. The model constructed by the optical society represents the current state of the art in the visualization of color scales. However, most books on color for artists and designers are restricted to a few major color scales. Tint scales add increasing amount of the achromatic color white to pure hues. Shade scales add increasing amount of achromatic black to pure hues. Tone scales add increasing amounts of colors on the gray scale. There are also "uniform chroma" scales which are tint, tone, or shade scales with compensating amounts of pure hue added to keep saturation constant.

The physical representation of color scales by the Optical Society of America is by no means complete. The lack of completeness has been underscored by the development of twenty-four-bit computer graphic systems which have made palettes of 16.8 million colors available for use. This is a much wider range of color choice than has ever been available to an artist. There have been no tools which enable the visual artist to take full advantage of this color capability. Even the best twenty-four-bit computer painting programs lack techniques which allow color use in computer graphics to come close to the remarkable display of colors in nature. This is one of the starting points for the present invention. What is needed is a systematic tool for utilizing the full color possibilities of twenty-four-bit graphics.

This invention also relates to the visualization of information. The process of map making has been expanded to such maps as maps of galaxy distribution, maps of brain activity, maps of genes on the human genome, and satellite maps of the earth and ocean surfaces. In addition, there is increasingly sophisticated medical imaging and visualization in complex data bases. Many maps use color to reveal pattern. Heretofore, color choice has been arbitrary and without a systematic method of choosing and scaling colors that best highlight the patterns.

The parent invention was particularly useful to fractal geometry, a geometry of fractional dimensions which describes objects or sets via the procedures which generate them. There is a branch of fractal geometry useful for image compression of real-world images. One interactive method, Barnsley, U.S. Pat. No. 4,941,193, sometimes requires the mapping of colors onto a fractally-encoded image. Therein the colors are mapped onto numerical measures which are generated by the fractal mathematics. Alternatives for color imaging may provide advantages over the Barnsley technique used for color mapping.

While the invention disclosed in the parent application provides systematic tools for choosing appropriate palettes for various maps and for scaling the color transitions to best highlight desired features, the techniques disclosed therein were best adapted to irregular geometric patterns which already had an inherent order, such as fractal maps. However, only limited control was provided to retain natural features of contrast exhibited primarily as luminance (value), as found in images of natural objects, such as three-dimensional objects or two-dimensional decorative patterns with high color symmetry related to shape. What is needed is a mechanism allowing the recoloring of images while retaining key aspects of contrast which carry geometric information.

SUMMARY OF THE INVENTION

According to the invention, a color palette mapped to an image obtained by any known process is decomposed to separate contrast components from hue/saturation pairs, then only the hue/saturation pairs are remapped to a new set of hue/saturation parameters according to available mapping techniques, including remapping of ordered color sets, into a new ordered set wherein at least a portion of the contrast components are held at fixed numerical values and not altered. By fixing the contrast components, color remapping is constrained to certain symmetric transformations in Munsell color space which preserves features of the source image in the resultant image.

The present invention may be used with the color editing invention of the parent application, as well as with other color rendering techniques, such as fractal geometry, iterated function systems, texture synthesis systems and color editing systems, such as the system disclosed in U.S. Pat. No. 4,500,919 of Schreiber and assigned to the Massachusetts Institute of Technology or U.S. Pat. No. 4,941,193 of Barnsley assigned to Iterated Systems Incorporated. Specifically, the method described in the present application for producing an ordered target file, hereinafter explained, provides an alternative method to the Barnsley technique for generating a numerical ordering for a real-world image.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DESCRIPTION OF SPECIFIC EMBODIMENTS

Figure 1:
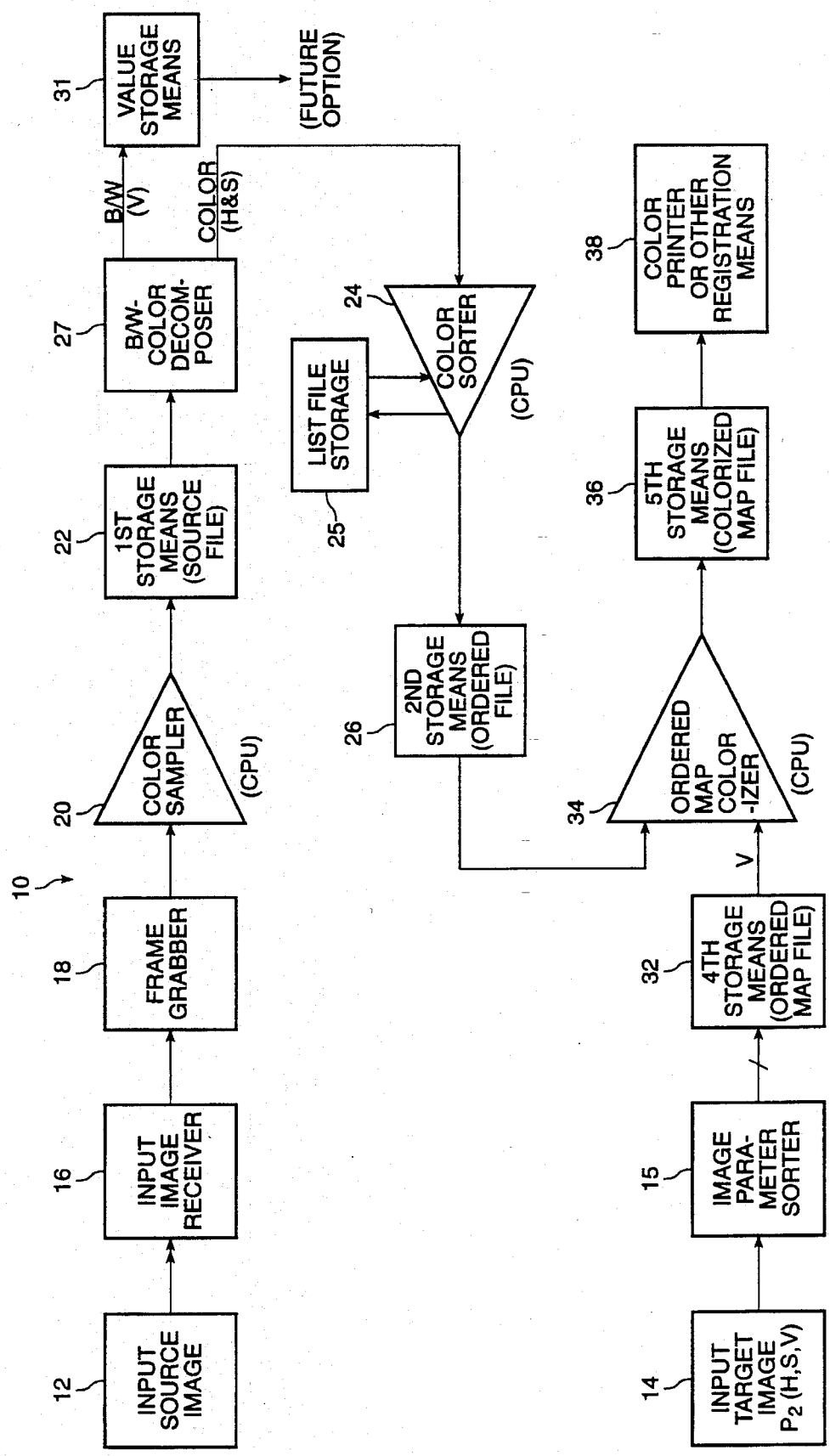
FIG. 1 is a block diagram of a system for use according to the invention.

Referring to FIG. 1, there is shown a block diagram of one embodiment of a system 10 according to the invention. The system 10 operates on two inputs, an input source image 12 and an input target image 14. The colors of input source image 12 may be derived directly from a real object, photograph, art print, painting or the like. An input image receiver 16 may be in the form of a video camera or alternatively an image scanner.

The output of the input image receiver is coupled to a frame grabber 18, which is a device (frequently integrated with the functions of a scanner) which captures and thus freezes a frame in a memory for subsequent use or analysis, converting the image into a conventional computer file format consisting of a bit map of the image or a standard pixel graphics file of red-green-blue (RGB) colors. The output of the frame grabber 18 is coupled to a color image sampling means 20 which converts the multiple-color RGB image into a twenty-four-bit reduced color image. A suitable color image sampling means 20 is an computer program such as PhotoShop by Adobe Systems of Mountain View, California, operating on a Macintosh II-type computer of Apple Computer of Cupertino, California. Other means are also suitable.

The color image sampling means 20 produces a desired color source file which is stored in a first video storage means 22. The color source file contains preferably at least the 256 colors best suited to reproduce the range of colors of the source input image 12. Optionally, the color sampler may preserve a broad range of colors from the 24-bit reduced color image, which may be colors from a choice of 16.8 million different colors.

According to a first embodiment of the invention, the color source file in the first storage means 22 is decomposed by a B/W-color decomposer 27 into gray-scale elements (components for a black and white image) and into color elements by separating the "value" channel ("value" or luminance positions in an array in color space) from the "hue" and "saturation" channels ("hue" and "saturation" positions in the array in color space). Thereafter, the gray-scale elements ("value") may be ignored or otherwise stored for future options in a value storage means 31. The hue and saturation parameters are thereafter provided to a color sorting means 24. The color sorting means 24 is provided for sorting the color source file into a logical color order for colorizing a target image. The color sorting means 24 is embodied in a dedicated processor or in a set of computer programs which operates as hereinafter explained. In connection with a buffer for temporary storage, called list file storage 25, the color sorting means 24 generates an ordered file which is ordered by color position in flattened two-dimensions of Munsell color space, i.e., projecting the "value" elements onto a plane representing all "value" parameters. The ordered file is stored in a second storage means 26. The second storage means 26 is coupled to provide input for further processing into an ordered map colorizer 34, which requires a second input as hereinafter explained.

A second system input is taken from the input target image 14. This input image provides a map wherein each spatial position (x,y) is associated with a third coordinate (z) or term representing some feature of the map. The term could represent height, density or any other continuous variable that can be associated with a number, as hereinafter explained.

Figure 2:
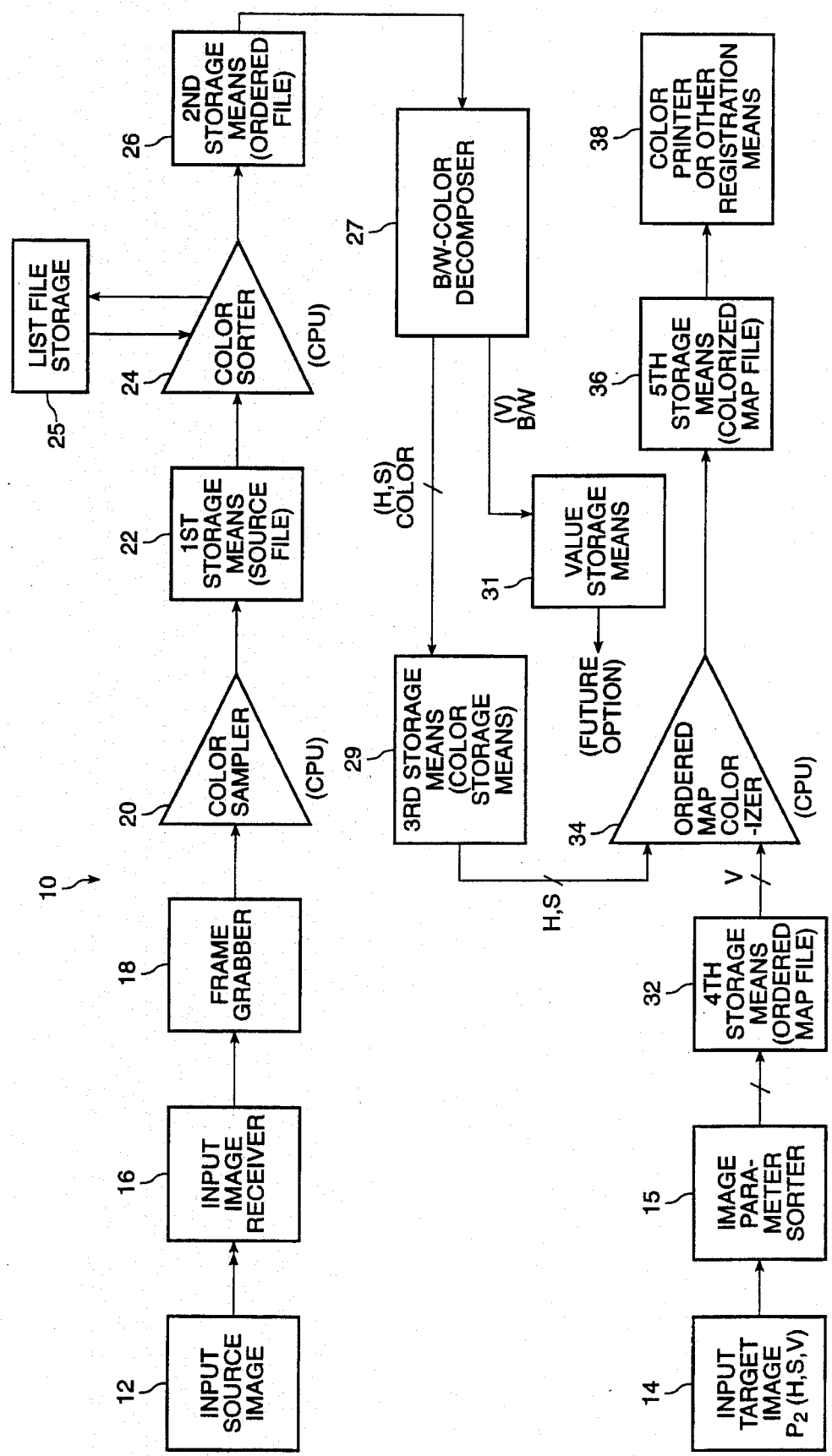
FIG. 2 is a block diagram of an alternative system for use according to the invention.

Referring to FIG. 2, an alternative embodiment of the source image processing is shown. As before, the system 10 operates on two inputs, an input source image 12 and an input target image 14. The colors of input source image 12 may be derived directly from a real object, photograph, art print, painting or the like. The input image receiver 16, the frame grabber 18 and the color image sampling means 20 produce a desired color source file which is stored in the first video storage means 22 as before. The color source file contains preferably at least the 256 colors best suited to reproduce the range of colors of the source input image 12. Optionally, the color sampler may preserve a broad range of colors from the 24-bit reduced color image, which may be colors from a choice of 16.8 million different colors.

According to a second embodiment of the invention, the color source file in the first storage means 22 is provided to color sorting means 24 for sorting the color source file into a logical color order. The color sorting means 24 is embodied in a dedicated processor or in a set of computer programs which operates as hereinafter explained. In connection with a buffer for temporary storage, called list file storage 25, the color sorting means 24 generates an ordered file which is ordered by color position in the cylinder of Munsell color space. The ordered file is stored in second storage means 26. The second storage means 26 is coupled to be decomposed by B/W-color decomposer 27 into gray-scale elements (components for a black and white image) and into color elements by separating the value channel from the "hue" and "saturation" channels. Thereafter, the gray-scale elements may be ignored (as if the Munsell color space were a circle) or otherwise stored for future options in value storage means 31. The hue and saturation parameters are thereafter provided to third storing means 29 to provide input for further processing into ordered map colorizer 34, which requires a second input as hereinafter explained.

Referring to FIG. 1 or 2, the input target image 14 in the form of an array of pixels defined by hue, saturation and value elements at each pixel ($P_i$(h,s,v)) are provided to an image parameter sorter 15. (These pixel values may originate in RGB space which are converted to hsv values before the next processing step.)

The image parameter sorter 15 first catalogues the pixels by color and then the sorter orders each hue, saturation and value triplet by color order. The sorting process is similar to the color sorting process hereinafter explained and disclosed in the parent application, except that ordering corresponds to collections of pixels in the pixel map (i.e., 1–N pixels vs. 1-N colors).

Referring to either FIG. 1 or FIG. 2, the sorted input target image from the image parameter sorter 15 is stored in a fourth storage means 32 as an ordered map file. The two ordered files from the third storage means 29 and the fourth storage means 32 may thereafter be mapped onto one another. An ordered map colorizer 34 receives as input both ordered files from the third storage means 29 and the fourth storage means 32. The colors in the third storage means 29 of FIG. 2 or of the second storage means of FIG. 1, either of which are hue saturation pairs, simply replace the hue and saturation parameters or terms of the ordered map of the target image from the fourth storage means, and the results may be displayed directly or preferably stored in a fifth storage means 36 as a colorized map file. The colorized map file may thereafter be presented in a twenty-four-bit color output device 38, such as an RGB display monitor, a high-resolution twenty-four-bit graphics color printer or film recorder/slide maker. A slide maker may produce a slide which can be used for printing photographic images on any permanent medium, such as paper, fabric or ceramic. The colorized map file can also be used as input to other output devices, such as numerically-controlled looms for making fabrics.

Figure 3A:
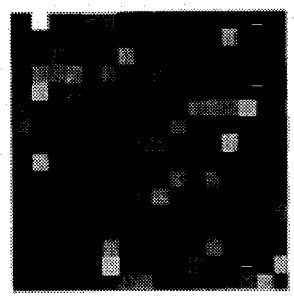
FIG. 3A is an illustration of an unordered palette of colors from a source image which illustrates source colors to be mapped to target images.
Figure 3B:
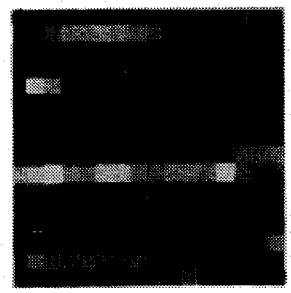
FIG. 3B is an illustration of an ordered palette of colors, which has been ordered by the process described in the parent application, herein incorporated by reference.

In order to illustrate the improvement of the present invention over other colorizing techniques, including the prior work of the present inventor, reference is made to photographic illustrations of FIG. 3A through FIG. 3H. FIG. 3A is an illustration of an unordered palette of colors from a source image which illustrates source colors to be mapped to target images. By contrast, FIG. 3B is an illustration of an ordered palette of colors which has been ordered by processes described in the parent application, herein incorporated by reference and made a part hereof. These two palettes may be used to colorize specimen images.

Figure 3C:
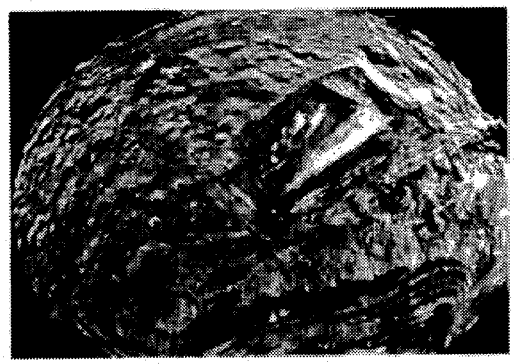
FIG. 3C is an illustration of a gray scale specimen or target image to be colorized according to the invention.
Figure 3D:
FIG. 3D an illustration of a color specimen or target image to be recolorized according to the invention.
Figure 3E:
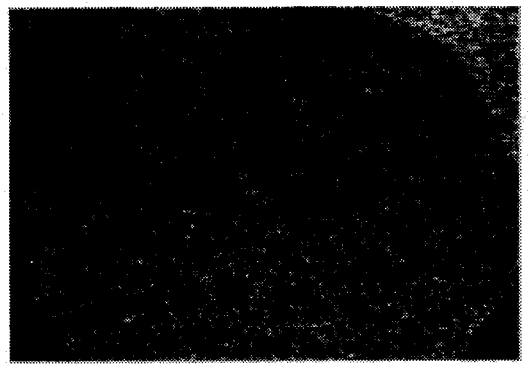
FIG. 3E is an image of FIG. 3C colored with the palette from FIG. 3A.

FIG. 3C is an illustration of a gray scale specimen or target image, namely, of a moon of Neptune. It is to be preferably colorized according to the invention using the ordered palette, as hereinafter shown. It is to be noted that the image has a natural gradation across the gray scale. In addition, FIG. 3D is an illustration of a color specimen or target image, namely Bryce Canyon, to be recolored according to the invention. The illustration of Bryce Canyon has a rich set of colors with rich red and brown content and many subtleties of shading and is therefore an instructive illustration.

Where the unordered palette of FIG. 3A is mapped onto the image of FIG. 3C, a result as shown in FIG. 3E is produced. The consequence is an aesthetically-displeasing and disharmonious distribution of color across the colorized image. These poor results follow from the absence of any one of three factors: 1) ordering of the target image as herein described, 2) ordering of the palette as described in the parent application, or 3) black-white decomposition in the process of remapping according to the invention.

Figure 3F:
FIG. 3F is an image of FIG. 3C colored with the palette from FIG. 3B.

FIG. 3F is a result obtained when all three factors are present. FIG. 3F is an image derived from FIG. 3C (the intermediate subsequently-ordered target file is not illustrated, as no meaningful information would be evident) constructed by colorizing with the ordered palette from FIG. 3B and subjected to the black-white decomposition process according to the invention. There is an aesthetically-pleasing distribution of color under these circumstances.

Figure 3G:
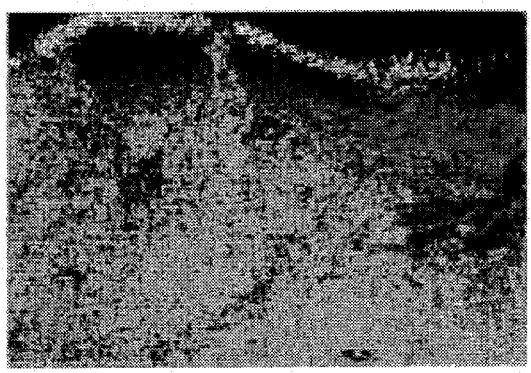
FIG. 3G is an image of FIG. 3D colored with the palette from FIG. 3A.

FIG. 3G is a processed image of the color target image FIG. 3D recolored with the unordered palette from FIG. 3A. Again, the result is a disharmonious color image. In fact, the details of the structure underlying the color image are obscured in either black and white or color renditions.

Figure 3H:
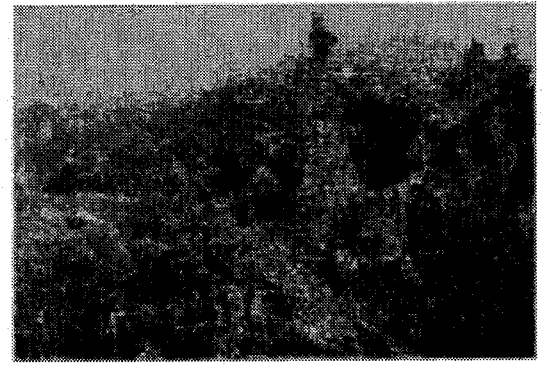
FIG. 3H is an image of FIG. 3D colored with the palette from FIG. 3B.

By contrast, FIG. 3H is a processed image created from an ordered image derived from FIG. 3D (ordering required) and colored with the ordered palette from FIG. 3B and decomposed in accordance with the invention. The natural harmony of color and form in the image is preserved, as is evident in either a black and white or a colored rendering, despite substantial image complexities as a result of the mapping. The product is a recognizable altered image, which, depending on the choice of the palette can alternatively be a surreal or hyperreal image.

Description - Operation

Figure 4:
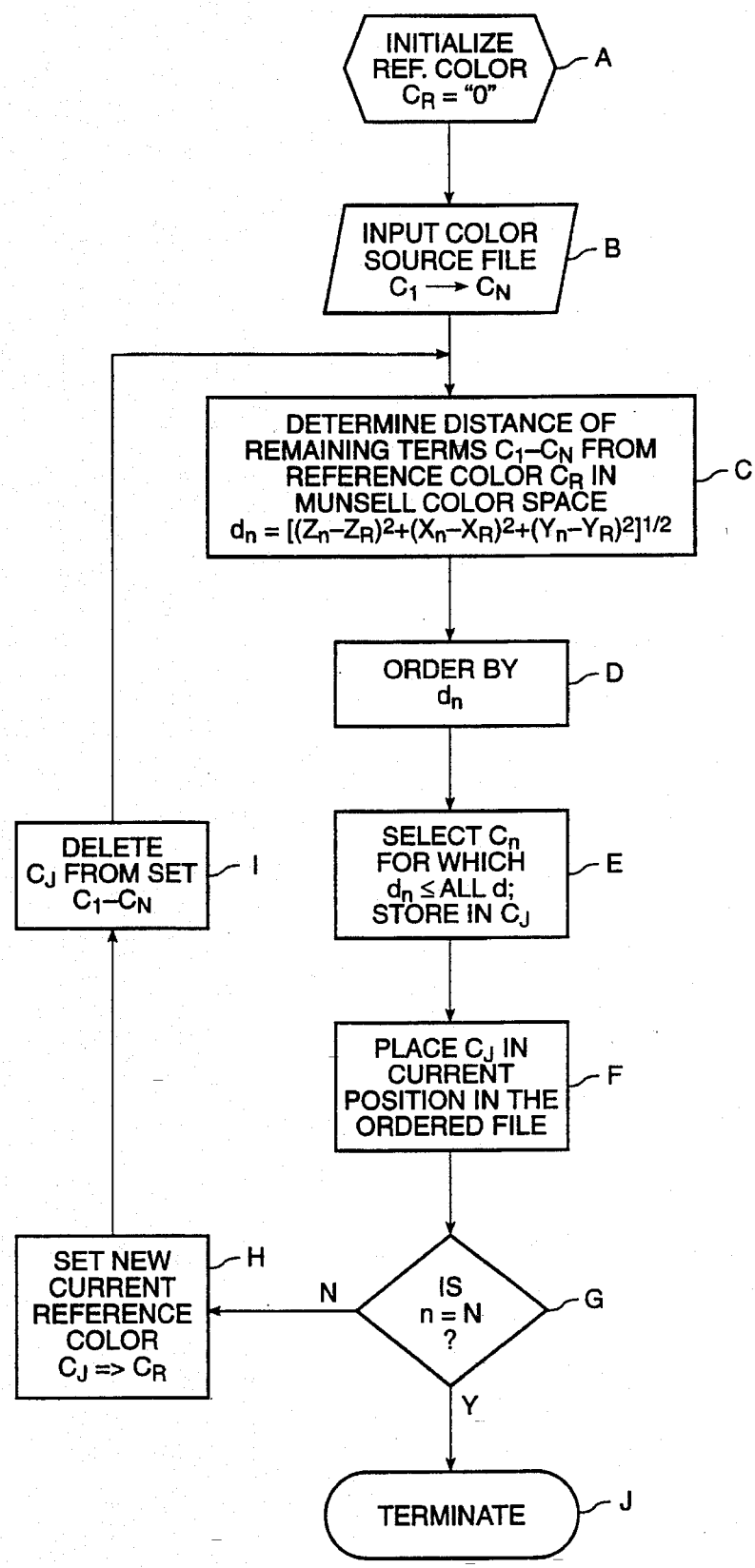
FIG. 4 is a flow chart of a process according to the invention.

Referring to FIG. 4, operation of the invention is described in relationship to colors. The three-dimensional case is explained, with the special case of a two-dimensional sort being explained where it differs. A reference color or initial reference $C_R$ is established by initialization (Step A). The reference color is typically the value (luminance) representing black for a three-dimensional sort. (For a two-dimensional sort, the reference is set for example with hue equal to 0 degrees and saturation equal to one per cent.) An image of an object or photograph is then input as the input color source file, as previously identified in FIG. 2 as the source file of the first storage means 22 as pixels $C_1$–$C_N$ (Step B). There are three dimensions of information: hue, saturation and value. (In the event the image has been decomposed, as in the case of the embodiment of FIG. 1, there are only two dimensions of color information: hue and saturation, since value has been preset to a constant and is therefore not a sort parameter.)

In the next step, the source file is tested to determine the distance of each of the current (remaining) terms $C_1$, $C_2$, ..., $C_N$ in the source file, excluding (components for a black and white image) and into color the value $C_R$ (Step C). (It is assumed that if the color was stored in RGB form, it has been converted to the alternative color representation system of hue, saturation, and value in Munsell color space, the Munsell system of color representation being the standard adopted by the American Optical Society for color ordering.) The distance measurement is done using the mathematical formula for the distance between two points in three dimensional space:

$$d = \text{sqrt}[(\text{hue}_{ref} - \text{hue}_{color\,i})^2 + (\text{saturation}_{ref} - \text{saturation}_{color\,i})^2 + (\text{value}_{ref} - \text{value}_{color\,i})^2]$$

wherein i is an index. p P In a generalized function, hue= X, saturation= Y and value= Z. In the case of a decomposed source file, the value term Z is ignored, as the reference term for value is always equal to the color term for value.

The distance function is calculated between the reference color and each color in the source file. These distance values are all stored temporarily in the list file storage area 25 associated with the color sorter 24 of the computer. This storage area 25 is for the file referred to the list file.

In the next step the list file is ordered from least to greatest distance (Step D), and then a color $C_J$ (either the parametric triplet or the pair) is selected which is the color $C_n$ which is smallest distance from the initial reference color $C_R$ (Step E). This color $C_J$ is then stored in the current (e.g., first empty) position in the ordered file of the second storage means 26 (Step F). A test is made to determine whether all N colors have been placed in the ordered file (Step G). If not, the reference color $C_R$ is replaced by the current color $C_J$ (Step H), and the color $C_J$ is removed from the set $\{C_1, ..., C_N\}$ (Step I). Steps C, D, E, F, and G are then repeated on the new smaller set with the current reference color to obtain a new ordered color. For 256 colors, the process is terminated (Step J) after about 32,000 steps. For twenty-four bit color, the number of steps is a function of the number of different colors in the image. The result is a valuable numerical representation of colors storable in a digital computer file and directly useable to produce an output in the form of a colored object which is recolored by painting or by construction using the novel color palette.

Figure 5:
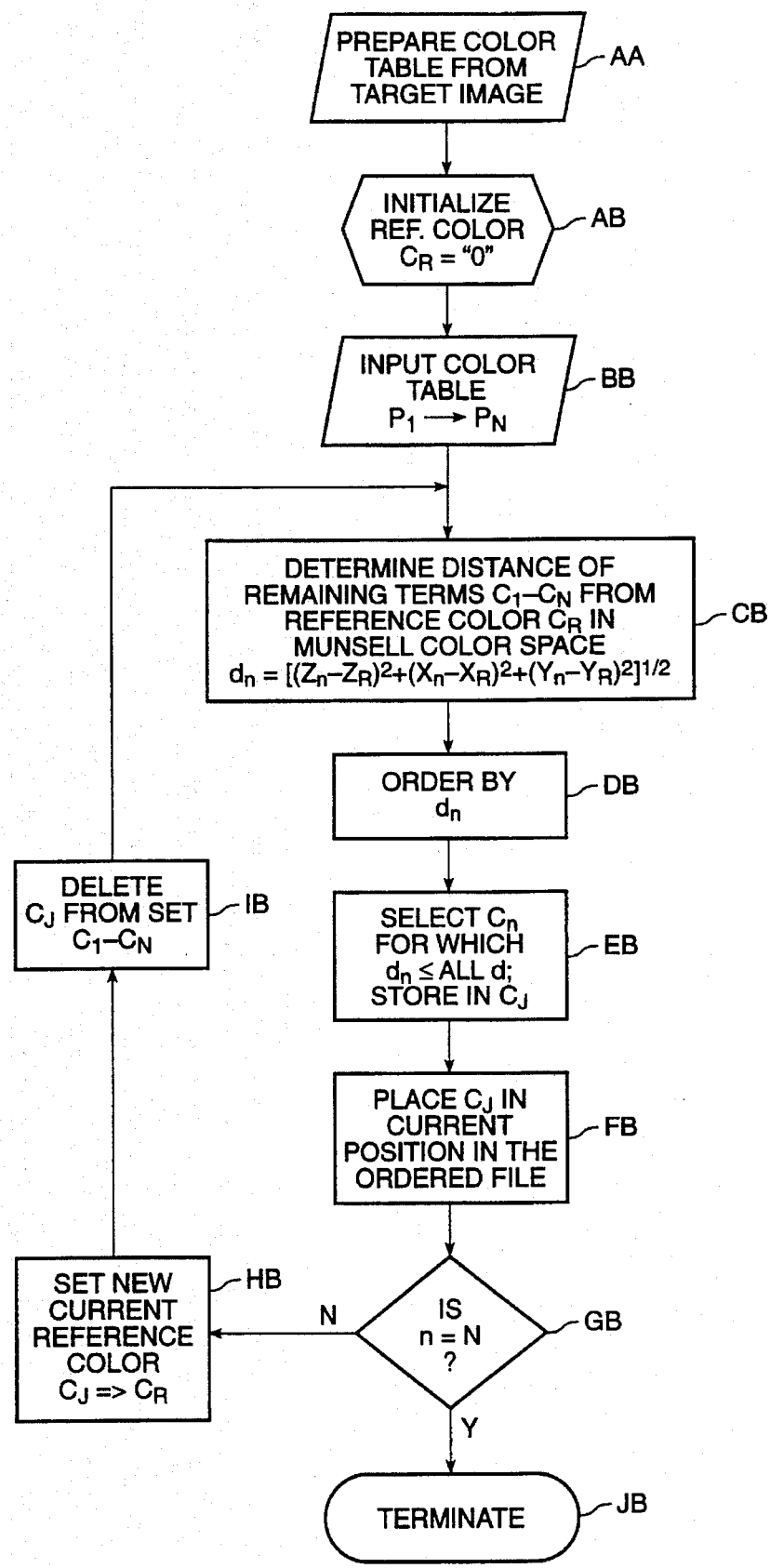
FIG. 5 is a flow chart of an alternative process according to the invention.

FIG. 5 illustrates the process carried out primarily in the image parameter sorter 15 on the input target image $P_I$(H, S,V) represented as element 14 in FIG. 1 or FIG. 2. The process is very similar to the process carried out in the color sorter 24. However, the process of FIG. 5 differs in that the target image is first tabulated to organize the collections of pixels of each color. Specifically, a color table is prepared (Step AA) by analyzing the input target image to identify the number of different colors in HSV color space, and each pixel is indexed to the various points in HSV color space, each one of the points in HSV color space being assigned an arbitrary unique reference number. The arbitrary reference number is then used as an id for the referenced pixels for sorting and ordering in color space.

A reference color or initial reference $C_R$ is established by initialization (Step AB). The reference color is typically the value representing black for a three-dimensional color sort. The indexed data, as described above and as previously identified in FIG. 2 as the input target image 14 of pixels $P_I(H,S,V)$ or $P_1$ through $P_N$ (which is generally in an arbitrary order), is input to the image parameter sorter 15 (Step BB).

In the next step, the indexed data from the input target image is tested in color space (on the hue, saturation and value parameters) to determine the distance of the parameters representing each of the current (remaining) terms $P_1$, $P_2, \ldots, P_N$ in the target image file from the reference value $C_R$ (Step CB). Color representation of hue, saturation, and value in Munsell color space is the standard herein for metering distances. The distance measurement is done using the mathematical formula for the distance between two points in the three dimensional space:

$$d = \text{sqrt}[(\text{hue}_{\text{ref}} - \text{hue}_{\text{color } i})^2 +$$

$$(\text{saturation}_{\text{ref}} - \text{saturation}_{\text{color } i})^2 + (\text{value}_{\text{ref}} - \text{value}_{\text{color } i})^2]$$

where i is an index.

In a generalized function, hue= X, saturation= Y and value= Z. In the case of a decomposed source file, the value term Z is ignored, as the reference term for value is always equal to the color term for value.

The distance function is calculated between the reference color and each color parameter triplet in the source file. In the next step the resultant pixel index reference terms are ordered from least to greatest distance in color space (Step DB), and then a color $C_J$ is selected which is the color $C_n$ which is smallest distance from the initial reference color $C_R$ (Step EB). This color $C_J$ is then stored in the current (e.g., first empty) position in an ordered file herein called the fourth storage means 32 (Step FB). A test is made to determine whether all N colors have been placed in the ordered file (Step GB). If not, the reference color $C_R$ is replaced by the current color $C_J$ (Step HB), and the color $C_J$ is removed from the parameter set for pixels $\{P_1, \ldots, P_N\}$ (Step IB). Steps CB, DB, EB, FB, and GB are then repeated on the new smaller set of parameters relative to the current reference color to obtain a new ordered color parameter. The result is a computer file with subsequent applications as hereinafter described.

Figure 6A:
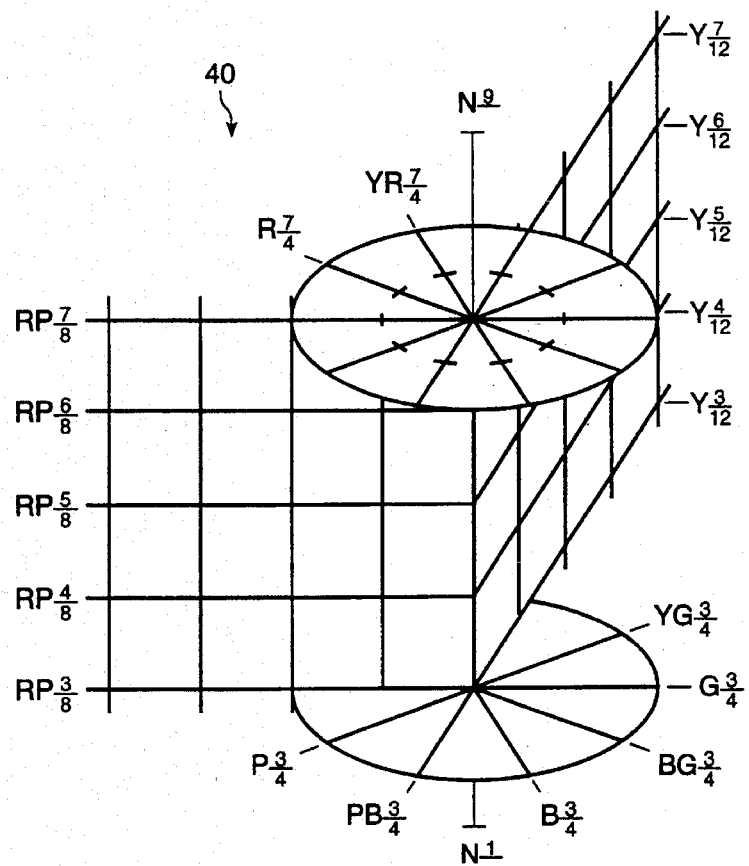
FIG. 6A is a standard depiction of Munsell color space.
Figure 6B:
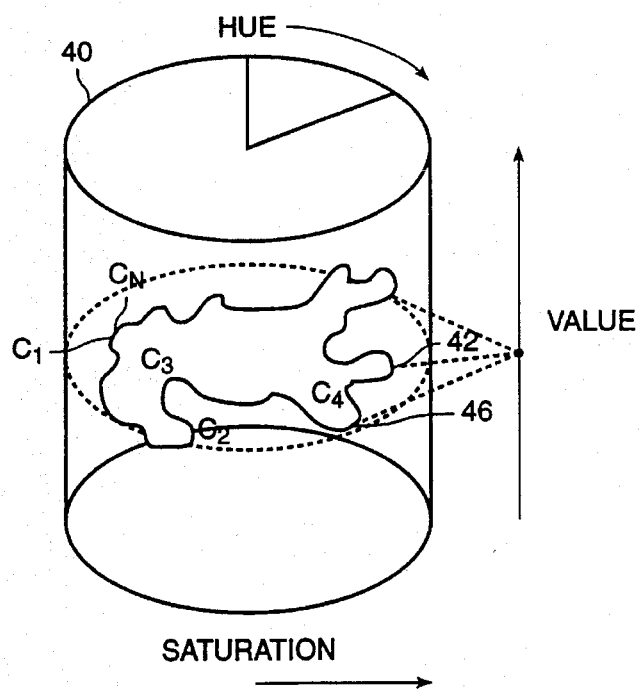
FIG. 6B is a two-dimensional trajectory in Munsell color space of the "hue-saturation" pairs on one "value" plane wherein the "hue-saturation" pairs of the source image are mapped onto "value" parameters of the target image according to the invention.

FIG. 6A is a standard representation of Munsell color space 40 which is a cylinder which has polar coordinates (radius Y and angle X) and height Z. FIG. 6B is a trajectory 42 through the Munsell color space 40. The ordered file of second storage means 26 contains the trajectory 42 of the colors through the Munsell color space 40 generated by selecting the smallest incremental distance between colors (features) from the source file. (As a tie-breaking scheme, the trajectory 42 may be tested for the shortest distance over successive points.) The trajectory 42 according to the invention is on a single value plane, i.e., more precisely, it is independent of the value. The ordered file is a signature which uniquely represents the color usage of an image as a mathematical function in a multidimensional space. Most importantly, in a specific embodiment of a color space, this signature captures the color transitions in an image. It is believed that these color transitions give rise to the aesthetically-pleasing and remarkable color effects seen in nature. The ordered color file according to the invention allows nature's coloring scheme to be made available in an orderly form to a designer or artist.

The creation of the ordered color file shows that an object or image exploits a certain region of color space. This invention allows one to visualize the path an image or object takes as it explores color space.

Figure 7A:
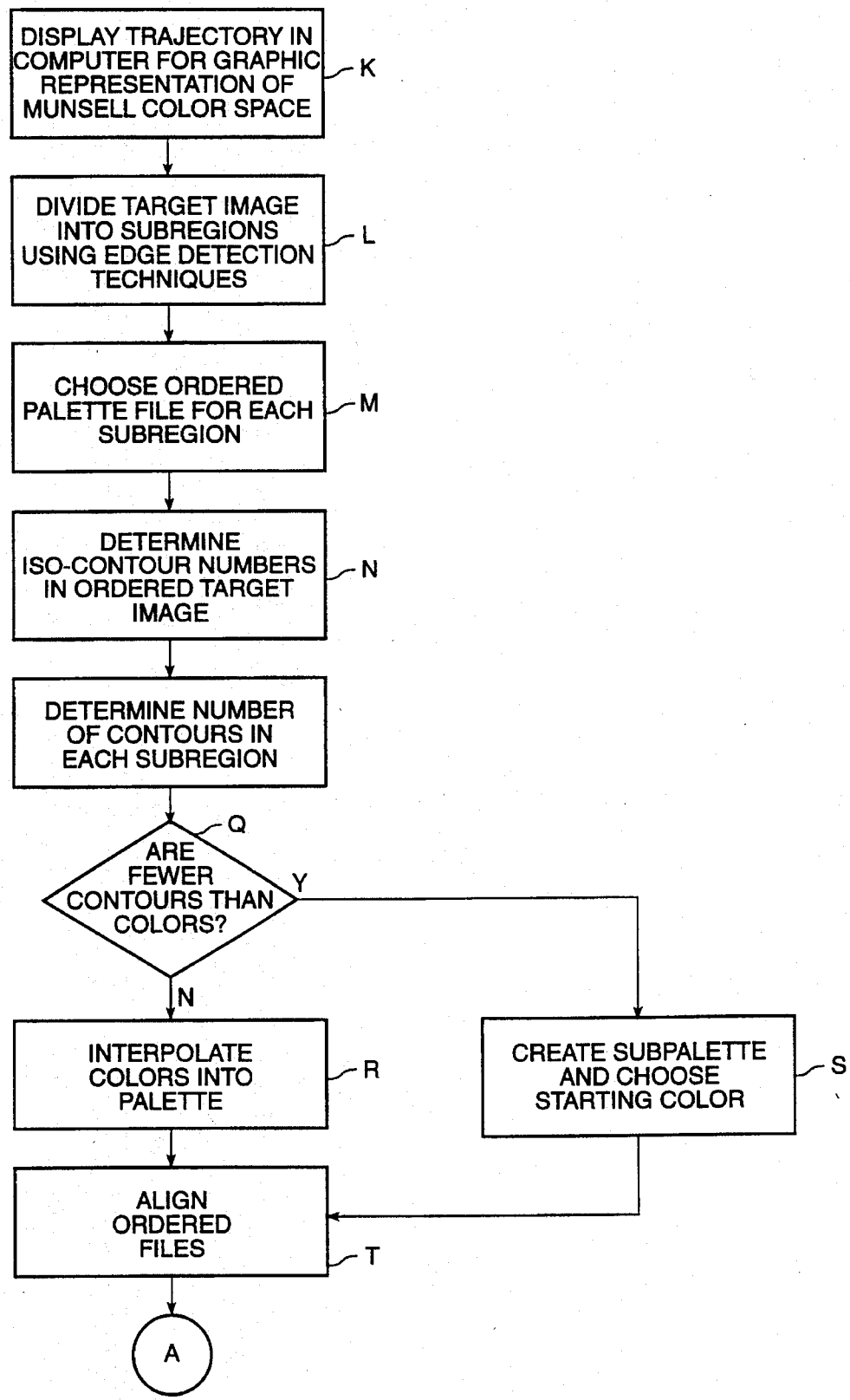
FIG. 7A and 7B are together a flow chart illustrating the process of colorizing an image according to the invention.
Figure 7B:
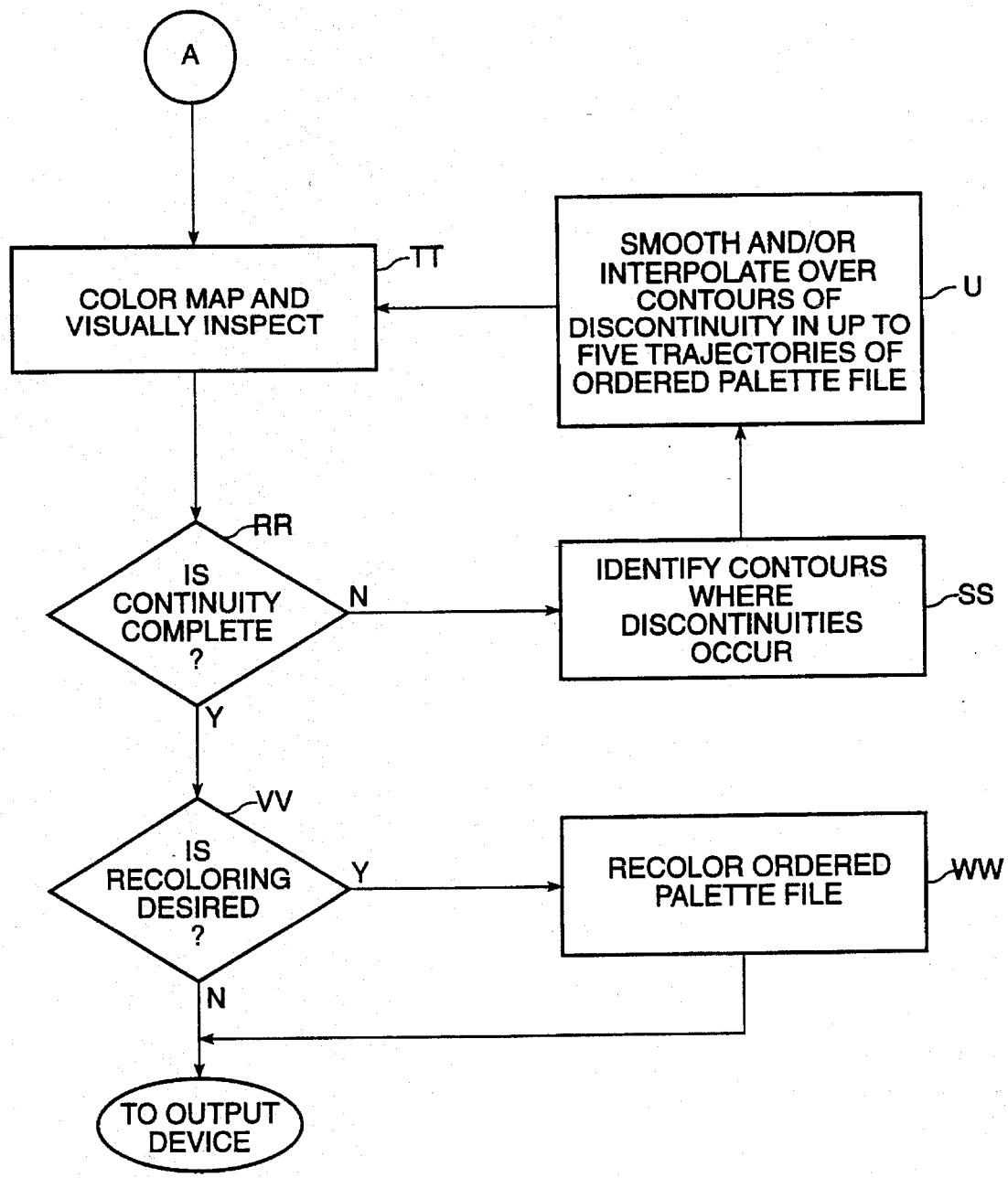

Referring to FIG. 7A and FIG. 7B, the process of colorizing a target image (FIG. 3C) according to the invention is illustrated. A preferred method of representing the color trajectory 42 (FIG. 6) as graphs would be to display a three-dimensional perspective representation in color space as a three-dimensional object (Step K) (FIG. 7A). Each point on a graph would represent the hue, saturation and value components of color in the three-dimensional color space, or if in two dimensions on a single value plane, simply hue and saturation. This can be readily accomplished using 3D computer graphics technology. In the present invention, the object is to make the hue-saturation pair independent of brightness.

To process the target image, the target image is divided into subregions using standard edge detection techniques if different parts of the image require different palettes (e.g., hair and skin) (Step L). Then the ordered palette file for each subregion is chosen (Step M).

Thereafter, iso-contour numbers corresponding to the colors in the ordered palette extracted from the target image are identified in the ordered map of the exemplary target image 28 (FIG. 3A) (Step N). Then the number of contours in each subregion is determined (Step O), and a test is made to determine whether there are fewer contours than colors (Step Q). If no, the colors are interpolated into the palette between the starting point and the ending point of the trajectory, so that the trajectory can be closed (Step R). This will allow the starting and ending colors of the mapping to be chosen by the user. If yes, then the subpalette is made by choosing a starting and ending point in the palette chosen for remapping (Step S). Thereafter, the ordered target image is aligned with the ordered palette chosen for recoloring (Step T). Specifically, the trajectory represented by the ordered file (the subregion) in third storage means 29 (FIG. 2) is aligned with the ordered map file in fourth storage means 32 (e.g., target image 28) by choosing the starting point on the trajectory and simply matching the two files by number.

The colors in the ordered file are then mapped onto the isocontour regions in the ordered target image for initial visual inspection (Step TT FIG. 7B).

One inspection is for continuity of the color transitions. If there are inappropriate discontinuities in the successive color ordering (Step RR), then the discontinuities can be eliminated by one or two operations. First, contours where the discontinuities occur are identified (Step SS). Then there is either or both a series of smoothing processes or interpolation processes applied to up to five selected trajectories of the ordered palette file (Step U). Interpolation is used for increasing the number of colors between any to point in a trajectory. Alternatively, smoothing is used to correct for jagged trajectories. Trajectories 42 will be jagged if the color sampling process discards some of the colors in the original image or object, or if the color transitions in the ordered palette file which has been chosen for remapping do not match the transitions needed for recoloring the isocolor regions of the target image. The distance in color space between successive colors in the ordered color file can be greater than the closest colors in the original image. The jagged paths in the ordered color file correspond to transitions between colors in color space that are too sharp for smooth transitions because of sampling at insufficient resolution.

A theorem in fractal geometry called the Shadowing Theorem shows how a jagged trajectory can be approximated with a smooth curve. By making the reasonable assumption that actual trajectory in color space of a full twenty-four-bit image is the smoothest graph containing all of the 256 points in the ordered file stored in third storage means 29 allows use of the Shadowing Theorem to produce an approximation of the shape of the full color trajectory of an image or object.

In order to achieve eye-pleasing effects in medium-sized iso-color regions, it is preferred that the Shadowing Theorem be applied to smooth the trajectory.

The application of the Shadowing Theorem may be as follows: A smooth curve is drawn to approximate a region to be examined, and then several straight line segments are used to approximate the curve, then a region of the curve containing "n" points is picked, and the distance between the starting and ending points in color space is determined along the segments approximating the original trajectory using the distance function in three-space and the trajectory is converted into equally-distanced steps along the segments of the curve. The colors then currently between the starting and ending colors are replaced with the same number of colors, but positioned at regular (smoothed) intervals between the starting and ending colors in the region. By smoothing the trajectory of colors in this way, it is possible to greatly improve the aesthetics of the color transitions without losing any of the richness of the colors derived from the input source image from which the colors derive. In addition to these operation which reduce the color variations in an ordered palette, there may be instances where the color transition are too small for resolution into color variations. In such a case, one may increase color variation by use of a reverse interpolation process in order to increase the distance between successive colors along the color trajectory.

The five trajectories upon which smoothing and interpolation (and reverse interpolation) may be performed are (1) the full three-dimensional ordered trajectory (H,S,V); (2) the ordered H,S pairs; (3) the ordered values (V) alone; (4) the ordered hues (H) treated independently; and (5) the saturation (S) treated independently.

The ordered colorized target image stored as an ordered colorized map file (Element 36) is again ready for inspection (Step TT) upon completion of the interpolation and smoothing process (Step U). The inspection step is typically a manual step which is part of a recursive process to check to see if there is continuity which is satisfactory aesthetically, as machines are not yet good judges of aesthetics (Step RR). Thereafter, recoloring may be considered (Step VV) and invoked (Step WW). This is particularly useful for artists or designers who need to optimize the coloring of a pattern or work of art in different color schemes, for example, wallpaper or fabric designs. Ordered trajectories are a particularly useful tool for doing this redesign. One method is hue rotation (where N/360 degrees of hue is added or subtracted to the hue parameter). Another method is trajectory displacement (where the trajectory "displayed" in the perspective model of 3D color space is moved to another position in color space without changing the ordering along the trajectory.) This allows a shifting without a change in relatively optimized relationship.

Other generalizations

The invention has thus far been explained with specific reference to a specific color decomposition, namely, the decomposition of value parameters from hue and saturation pairs. However, these same principles may be applied to the other color decomposition combinations. For example, hue may be decomposed out of, and redefined in combination with, a value/saturation pair set, or saturation may be decomposed out of, and recombined with, a hue/value pair set.

Conclusion, Ramifications, and Scope

This invention provides powerful new tools for the manipulation of ordered sets of information, with particular application to color. The full range of the value of these tools is probably not fully known at this time. For example, the invention allows mathematical maps, landscapes, computer generated plants, and organisms to be colored in any natural or artificial color scheme. It allows images to be ordered on the basis of iso-featured contours and then to be processed in a variety of new ways involving mapping of spatial variables. The invention also allows remarkable color effects to be added to any variable map. The method can be used in conjunction with fractal image compression and coding to produce remarkable effects. The invention allows a color palette from a natural object to be analyzed and transferred to mathematical maps and computer painting in general. It can provide new tools for the use of color in computer paint programs. It can provide new color effects for pure and applied art, with uses in the textile, advertising, packaging, computer and entertainment industries. It can provide a unique ability to color customize product lines and mathematical maps. For video, it can provide novel color transitions which would allow new dynamic effects.

The invention has been explained with reference to specific embodiments. Other embodiments will be apparent to those of ordinary skill in the art upon reference to this disclosure. For example, the process of ordering variables in a multidimensional space need not be limited solely to the applications relating to the analysis of color or the expression of information using color as a metric. A similar process can be used to generate fractal interpolation functions from information represented by a set of sampling points in a multidimensional space which have a path through the multidimensional space and to order the information in a lower dimension, ultimately expressing the information in as low as one dimensional space while preserving order and permitting interpolation between sampling points. The process thus has applications to certain classes of data compression and analysis, as well as to the color-related fields mentioned herein. It is therefore not intended that this invention be limited, except as indicated by the appended claims.

What is claimed is:

1. A method for colorizing a specimen image with a source of ordered colors having three image terms, namely a hue term, a saturation term and a value term, said specimen image being separated into an ordered set of image terms, including gray scale or colors expressible in a three-dimensional color space also expressible as image terms, including a hue term, a saturation term and a value term, the method comprising the steps of:

(a) establishing an ordered set of pixel values of said specimen image using a three-dimensional color scale;

thereafter (b) assigning to each member of said ordered set of pixel values said hue term and said saturation term according to ordering of said ordered set of image terms from said source of ordered colors while holding fixed the value term of said specimen image, thereby to obtain a palette of colors;

(c) mapping said palette to said specimen image, thereby to obtain a colored image comprising a distribution of colors over the specimen image; and (d) presenting the colored image of the specimen image through an output device for observation.

2. A method for colorizing a specimen image with a palette source of ordered colors, said method comprising the steps of:

(a) ordering said specimen image as pixels into an ordered set of image terms expressible in a three-dimensional color space of hue, saturation and value terms;

(b) storing said ordered set of image terms in an ordered image file;

(c) ordering a palette source of colors into an ordered set of palette terms expressible in a three-dimensional color space of hue, saturation and value terms;

(d) storing said ordered set of palette terms in an ordered palette file;

(e) decomposing each said ordered palette term in said palette file into a hue/saturation pair and a single value term;

(f) replacing each hue/saturation pair term of said ordered image file with a hue/color saturation pair terms from said ordered palette file according to a one-to-one correspondence while olding fixed the value terms thereby to obtain a colored image comprising a distribution of colors; and (g) presenting the colored image through an output device for observation.

3. The method according to claim 2, wherein the source of ordered colors is ordered by position in Munsell color space.

4. A method for colorizing a specimen image with a palette source of ordered colors, said method comprising the steps of:

(a) ordering said specimen image as pixels into an ordered set of image terms expressible in a three-dimensional color space of hue, saturation and value terms;

(b) storing said ordered set of image terms in an ordered image file;

(c) extracting a palette of colors from a source image;

(d) storing said palette of colors in a palette file;

(e) decomposing each term in said palette file into a hue/saturation pair and a single value parameter;

(d) ordering colors represented by each said hue/saturation pair into an ordered set of palette terms expressible in a two-dimensional trajectory in color space of hue/saturation pair terms;

(e) storing said ordered set of hue/saturation pair terms in an ordered palette file;

(f) replacing hue/saturation pair terms of said ordered image file with hue/saturation pair terms from said ordered palette file according to a one-to-one correspondence while preserving the value term thereby to obtain a colored image comprising a distribution of colors; and (g) presenting the colored image through an output device for observation.

5. The method according to claim 4, wherein the source of ordered colors is ordered by position in Munsell color space.

6. A method for colorizing a specimen image with a palette source of ordered colors, said method comprising the steps of:

(a) ordering said specimen image as pixels into an ordered set of image terms expressible in a three-dimensional color space of hue, saturation and value terms;

(b) storing said ordered set of image terms in an ordered image file;

(c) ordering a palette source of colors into an ordered set of palette terms expressible in a three-dimensional color space of hue, saturation and value terms;

(d) storing said ordered set of palette terms in an ordered palette file;

(e) decomposing said ordered palette file into sets of a pair of palette terms and a single palette term, said single palette term being said value terms;

(f) replacing two terms of said ordered image file with said pairs of palette terms from said ordered palette file according to a one-to-one correspondence while preserving the value term thereby to obtain a colored image comprising a distribution of colors; and (g) presenting the colored image through an output device for observation.

7. The method of claim 6, further including the steps, after the replacing step of:

(f1) adding points in color space connecting a first ordered point and a last ordered point of a full range ordered file and rescaling to a preselected number of points relative to a reference color in order to thereby obtain a closed ordered color file; and (f2) storing said closed ordered color file in a third memory means.

8. The method according to claim 7, further including the step, after step (f1), of:

(f1a) smoothing across adjacent features of the closed ordered color file, said features comprising hue, saturation and value terms in combination.

9. The method according to claim 8, further including the steps, after step (f1a), of;

(f1b) interpolating between ordered points in the closed ordered file thereby to obtain interpolated points; and (f1c) inserting the interpolated points in color order into the closed ordered color file.

10. An apparatus, including a central processing unit, for preparing ordered sets of colors expressible in three image terms, namely hue, saturation and value terms, of a three-dimensional color space from a source of information for use in mapping the information onto an ordered pattern in a lower dimensional image space as a specimen image, such as a two-dimensional physical surface, the apparatus comprising:

(a) means for establishing an ordered set of pixel values of said specimen image using a three-dimensional color scale;

(b) means coupled to said establishing means for assigning to each member of said ordered set of pixel values said hue term and said saturation term of said three image terms according to ordering of said ordered set of image terms from said source of ordered colors while preserving said value term of said specimen image, thereby to obtain a palette;

(c) means coupled to said assigning means for mapping said palette to said specimen image, thereby to obtain a colored image comprising a distribution of colors over the specimen image; and (d) an output device coupled to said central processing unit for presenting the colored image of the specimen image for observation.

* * * * *